US012238629B2

United States Patent
Bichot et al.

(10) Patent No.: US 12,238,629 B2
(45) Date of Patent: Feb. 25, 2025

(54) METHOD FOR DELIVERING AN AUDIO AND/OR VIDEO CONTENT IN A MOBILE NETWORK INFRASTRUCTURE

(71) Applicant: BROADPEAK, Cesson Sevigne (FR)

(72) Inventors: Guillaume Bichot, Cesson Sevigne (FR); Jérémy Desmauts, Cesson Sevigne (FR); Pierre-Jean Guery, Cesson Sevigne (FR)

(73) Assignee: BROADPEAK, Cesson Sevigne (FR)

( * ) Notice: Subject to any disclaimer, the term of this patent is extended or adjusted under 35 U.S.C. 154(b) by 367 days.

(21) Appl. No.: 17/798,178

(22) PCT Filed: Feb. 18, 2021

(86) PCT No.: PCT/EP2021/054055
§ 371 (c)(1),
(2) Date: Aug. 8, 2022

(87) PCT Pub. No.: WO2021/165416
PCT Pub. Date: Aug. 26, 2021

(65) Prior Publication Data
US 2023/0126039 A1    Apr. 27, 2023

(30) Foreign Application Priority Data
Feb. 20, 2020   (EP) ..................... 20290018

(51) Int. Cl.
*H04W 40/04*   (2009.01)
*H04L 65/1069*   (2022.01)
(Continued)

(52) U.S. Cl.
CPC ......... *H04W 40/04* (2013.01); *H04L 65/1069* (2013.01); *H04L 65/612* (2022.05); *H04L 12/44* (2013.01)

(58) Field of Classification Search
CPC ........................... H04W 40/04; H04L 65/612
See application file for complete search history.

(56) References Cited

U.S. PATENT DOCUMENTS

| 8,996,860 B1* | 3/2015 | Roth ............... H04L 67/142 |
| | | 713/153 |
| 2012/0054180 A1* | 3/2012 | Priyadarshan .... G06F 16/24575 |
| | | 707/E17.084 |
| 2020/0007226 A1* | 1/2020 | Takagi ............... H04L 67/289 |

OTHER PUBLICATIONS

Apr. 28, 2021 International Search Report issued in International Patent Application No. PCT/EP2021/054055.

(Continued)

*Primary Examiner* — Zhiren Qin
(74) *Attorney, Agent, or Firm* — Williams Mullen; R. Brian Drozd

(57) ABSTRACT

A content delivery system for delivering an audio and/or video content to a mobile terminal is deployed on top of a mobile network and includes plural edge cache servers arranged using a star or hierarchical topology. The edge cache servers are connected to respective aggregation nodes of the mobile network such that a configurable breakout function of the nodes enables routing thereto packets addressed to an anycast addressing associated with the servers. When receiving a request, from the mobile terminal, for obtaining a manifest file of the audio and/or video content, an edge cache controller of the content delivery system creates a session identifier including a unicast addressing part pointing to the controller, and redirects the mobile terminal to the anycast addressing of the servers. The servers then obtain the session identifier from the mobile terminal and use the unicast addressing contained therein to receive context information from the controller.

10 Claims, 6 Drawing Sheets

(51) Int. Cl.
*H04L 65/612* (2022.01)
*H04L 12/44* (2006.01)

(56) References Cited

OTHER PUBLICATIONS

Apr. 28, 2021 Written Opinion issued in International Patent Application No. PCT/EP2021/054055.

Dario Sabella et al. "Developing Software for Multi-Access Edge Computing". ETSI White Paper No. 20, Aug. 3, 2019, pp. 1-38, <URL: https://www.etsi.org/images/files/ETSIWhitePapers/etsi_wp20ed2_MEC_SoftwareDevelopment.pdf>.

* cited by examiner

METHOD FOR DELIVERING AN AUDIO AND/OR VIDEO CONTENT IN A MOBILE NETWORK INFRASTRUCTURE

TECHNICAL FIELD

The present invention generally relates to delivering audio and/or video contents, such as in a scope of Content Delivery Network (CDN), on top of a mobile network infrastructure, while ensuring service continuity during handovers of mobile terminals to which the audio and/or vide contents are delivered.

RELATED ART

MEC (Multi-access Edge Computing) is an ETSI (European Telecommunications Standards Institute) group and specifications set related to platforms that sit close to mobile network edges, typically located physically at eNodeB location or not far therefrom (typically at a central office). MEC defines conditions to trigger instantiation of applications mobile network edges, the way to steer traffic to/from the applications and how to embed, deploy and manage applications with MEC platform. Breakout functions are thus used as offloading solution of access networks to reduce load of core networks and end-to-end latency. One may for instance refer to ETSI White Paper No. 20, *Developing Software for Multi-Access Edge Computing*, Dario Sabella et al, $2^{nd}$ ed., February 2019, ISBN No. 979-10-92620-29-0.

Streaming audio and/or video over a mobile network is particularly challenging. Radio networks are very sensible and Round-Trip Time (RTT), as well as bandwidth, can vary quickly. Having a connection between a mobile terminal and an audio and/or video server of a Content Delivery Network (CDN, which resides far way (beyond mobile core network), making abstraction of radio access variability, has been shown to be suboptimal. Moreover, it is desirable, at least for resources consumption, to limit communication distances between the audio and/or video server and the mobile terminal to be served. It implies that, ideally, audio and/or video server infrastructure should be as close as possible to radio access network borders. Thus, MEC platforms seem to be well-suited for that purpose, in particular for 4G ($4^{th}$ Generation) and 5G ($5^{th}$ Generation) mobile networks. Audio and/or video cache servers can then be deployed deeply in the mobile network up to the radio network edges, using a break-out function as overseen by the MEC group. It is thus referred to as edge cache servers. Consequently the edge cache servers deployment infrastructure is distributed possibly across radio cells obliging the mobile terminal to be connected to possibly several audio and/or video servers during a media session.

It is then desirable to provide a CDN architecture on top of a mobile network infrastructure, which ensures audio and/or video delivery service continuity, in view of mobile terminals' mobility, and which further ensures that the mobile terminals are always connected to the closest possible edge cache server. It is then desirable to provide a CDN architecture on top of a mobile network infrastructure, which ensures that session context information is correctly managed and updated. Indeed, such context information is essential to determine whether a mobile terminal is authorized or not to get a particular audio and/or video content, and further contains analytical data that are crucial for mobile terminal session follow-up and further crucial for appropriate infrastructure deployment dimensioning.

SUMMARY OF THE INVENTION

To that end, it is herein proposed a method for delivering an audio and/or video content to a mobile terminal by a content delivery system deployed on top of a mobile network infrastructure, wherein the content delivery system comprises plural edge cache servers and at least one edge cache controller, the edge cache servers are arranged using a star topology or a hierarchical topology using a central content server as root, the edge cache servers and the central content server are connected to respective aggregation nodes of the mobile network infrastructure such that a configurable breakout function of the aggregation nodes enables routing to the edge cache servers or to the central content server packets addressed to an anycast addressing associated with the edge cache servers and the central content server, wherein the method comprises: receiving, by one edge cache controller, a first request, from the mobile terminal, for obtaining a manifest file of the audio and/or video content so as to start a session for delivering the audio and/or video content; creating, by the edge cache controller in question, a session identifier including a unique identifier part and a unicast addressing part pointing to the edge cache controller in question; responding to the first request, by the edge cache controller in question, by redirecting the mobile terminal to the anycast addressing of the edge cache servers and of the central content server and by providing the session identifier to the mobile terminal; receiving, by one edge cache server, a second request including the session identifier, from the mobile terminal, for obtaining the manifest file or for obtaining at least one segment of the audio and/or video content; obtaining from the second request, by the one edge cache server in question, the session identifier associated with the session started for delivering the audio and/or video content to the mobile terminal in question; when the obtained session identifier is unknown to the one edge cache server in question, using the unicast addressing part included in the obtained session identifier to send a third request for obtaining a context applicable to the session; when the obtained session identifier is known to the edge cache server in question or obtained by the edge cache server in question, delivering respectively the requested manifest file or the at least one segment to the mobile terminal, in response to the second request, according to the context applicable to the session; and when an edge cache server is not able to process new sessions, reconfiguring the breakout function of the aggregation node to which is connected the edge cache server in question so as not to route packets related to the new sessions toward said edge cache server in question so that an upstream edge cache server or the central content server is solicited to process the new sessions.

Thus, thanks to the anycast addressing of the edge cache servers and the central content server, audio and/or video delivery service continuity is ensured in view of mobile terminals' mobility, and it is further ensured that the mobile terminals are always connected to the closest possible edge cache server. Moreover, thanks to the foregoing approach for creating the session identifier, the edge cache servers are always capable of obtaining the context from the appropriate edge cache controller while the mobile terminal incurs handover in the mobile network infrastructure. Furthermore, the anycast addressing of the edge cache servers and the arrangement of the edge cache servers as a star topology or a hierarchical topology using the central content server as root ensures that the mobile terminal is always connected to the closest possible edge cache server (or to the central content server at most).

According to a particular embodiment, the content delivery system comprises plural edge cache controllers, the edge cache controllers are deployed using a star topology or a hierarchical topology using a central controller as root, the edge cache controllers and the central controller are connected to respective aggregation nodes of the mobile network infrastructure such that the configurable breakout function of the aggregation nodes enables routing to the edge cache controllers or to the central controller packets addressed to an anycast addressing associated with all the edge cache controllers and the central controller, and wherein the first request is transmitted using the anycast addressing associated with the edge cache controllers and the central controller.

Thus, using the anycast addressing for the edge cache controllers and the central controller enables, in conjunction with the arrangement of the edge cache controllers as a star topology or a hierarchical topology using the central controller as root, contributes to audio and/or video delivery service continuity is ensured in view of mobile terminals' mobility.

According to a particular embodiment, when one edge cache controller receives the third request for obtaining a context applicable to the session, the edge cache controller in question updates the context applicable to the session to indicate that the session is now supported by the edge cache server from which the third request is received.

Thus, analytical data for mobile terminal session follow-up is updated in the context, which is crucial to track mobility of the mobile terminals for appropriate infrastructure deployment dimensioning.

According to a particular embodiment, the edge cache controller in question checks whether or not none of the edge cache servers of a set of edge cache servers under its supervision have any more resources to accept new sessions, and when no more resources can be allocated to accept new sessions, the edge cache controller in question configures the breakout function of the aggregation node with which said edge cache controller is associated for not receiving anymore requests related to new sessions.

Thus, the handling of new sessions is transferred upstream (toward the root) in the arrangement of edge cache servers, and the new sessions are handled by the closest edge cache server that has available resources for processing said new sessions, while suing the same addressing since anycast addressing is being used.

According to a particular embodiment, when creating the session identifier, the edge cache controller in question includes therein a unicast addressing part pointing to the central controller instead of the unicast addressing part pointing to the edge cache controller in question, and wherein the edge cache controller in question transmits the context applicable to the session to the central controller.

Thus, centralized management of session contexts can be easily implemented (in complement or in replacement to distributed management of session contexts by the edge cache controller(s). It enables in particular to perform load balancing when lack of processing resources of the edge cache controller(s) occurs.

According to a particular embodiment, the edge cache controller in question manages a set of edge cache servers under its supervision by implementing on a regular basis: determining if each edge cache server of the set has sufficient resources to accept more sessions; and, for each edge cache server of the set which is not able to accept more sessions, the edge cache controller in question configures the breakout function of the aggregation node to which is connected the edge cache server in question for not routing new sessions thereto.

Thus, the edge cache controller configures the mobile network infrastructure so as to benefit from the anycast addressing of the edge cache servers and the central content server, as well as from the arrangement of the edge cache controllers as a star topology or a hierarchical topology using the central controller as root, in order to transfer upstream the handling of new sessions.

According to a particular embodiment, when one edge cache server receives the context applicable to the session, the edge cache server in question retrieves from statistics stored in the context, information related to quality in Adaptive Bit Rate which is preferably selected by the mobile terminal in the session.

Thus, the edge cache server in question can benefit from past data related to the session in question and anticipate internal configuration (such as cache provisioning) so as to best serve the mobile terminal with respect to the audio and/or video content and ensure good service continuity.

According to a particular embodiment, when being notified by one edge cache server that the session is interrupted without having received the third request from another edge cache server within a predefined timeframe, one edge cache controller invalidates the context associated with the session and transmits to an analytical server analytical data related to the session and contained in the context.

Thus, detection of appropriate time to invalidate the context due to session ending can be easily performed and the analytical data can be easily gathered.

According to a particular embodiment, the edge cache servers are virtual instances executed in a cloudlet infrastructure.

Thus, activation and deactivation of edge cache servers upon needs is made easy. It is further herein proposed a content delivery system for delivering an audio and/or video content to a mobile terminal, the content delivery system being configured for being deployed on top of a mobile network infrastructure, wherein the content delivery system comprises plural edge cache servers and at least one edge cache controller, the edge cache servers are arranged using a star topology or a hierarchical topology using a central content server as root, the edge cache servers and the central content server being configured to be connected to respective aggregation nodes of the mobile network infrastructure such that a configurable breakout function of the aggregation nodes enables routing to the edge cache servers or to the central content server packets addressed to an anycast addressing associated with the edge cache servers and the central content server, wherein the content delivery system is configured for: receiving, by one edge cache controller, a first request, from the mobile terminal, for obtaining a manifest file of the audio and/or video content so as to start a session for delivering the audio and/or video content; creating, by the edge cache controller in question, a session identifier including a unique identifier part and a unicast addressing part pointing to the edge cache controller in question; responding to the first request, by the edge cache controller in question, by redirecting the mobile terminal to the anycast addressing of the edge cache servers and of the central content server and by providing the session identifier to the mobile terminal; receiving, by one edge cache server, a second request including the session identifier, from the mobile terminal, for obtaining the manifest file or for obtaining at least one segment of the audio and/or video content; obtaining from the second request, by the one edge cache server in question, the session identifier associated with the session started for delivering the audio and/or video content to the mobile terminal in question; when the obtained session identifier is unknown to the one edge cache server in question, using the unicast addressing part included in the obtained session identifier to send a third request for obtaining a context applicable to the session; when the obtained session identifier is known to the edge cache server in question or obtained by the edge cache server in question, delivering respectively the requested manifest file or the at least one segment to the mobile terminal, in response to the second request, according to the context applicable to the session; and when an edge cache server is not able to process new sessions, reconfiguring the breakout function of the aggregation node to which is connected the edge cache server in question so as not to route packets related to the new sessions toward said edge cache server in question so that an upstream edge cache server or the central content server is solicited to process the new sessions.

BRIEF DESCRIPTION OF THE DRAWINGS

The characteristics of the invention will emerge more clearly from a reading of the following description of at least one embodiment, said description being produced with reference to the accompanying drawings, among which.

DETAILED DESCRIPTION OF AT LEAST ONE EMBODIMENT

For delivering an audio and/or video content to a mobile terminal, a content delivery system is deployed on top of a mobile network. The content delivery system comprises plural edge cache servers arranged using a star topology or a hierarchical topology. The edge cache servers are connected to respective aggregation nodes of the mobile network such that a configurable breakout function of the aggregation nodes enables routing thereto packets addressed to an anycast addressing associated with the edge cache servers. When receiving a request, from the mobile terminal, for obtaining a manifest file of the audio and/or video content, an edge cache controller of the content delivery system creates a session identifier including a unicast addressing part pointing to the edge cache controller, and redirects the mobile terminal to the anycast addressing of the edge cache servers. The edge cache servers then obtain the session identifier from the mobile terminal and use the unicast addressing contained therein to receive context information from the edge cache controller. Detailed embodiments are provided hereafter.

Figure 1:
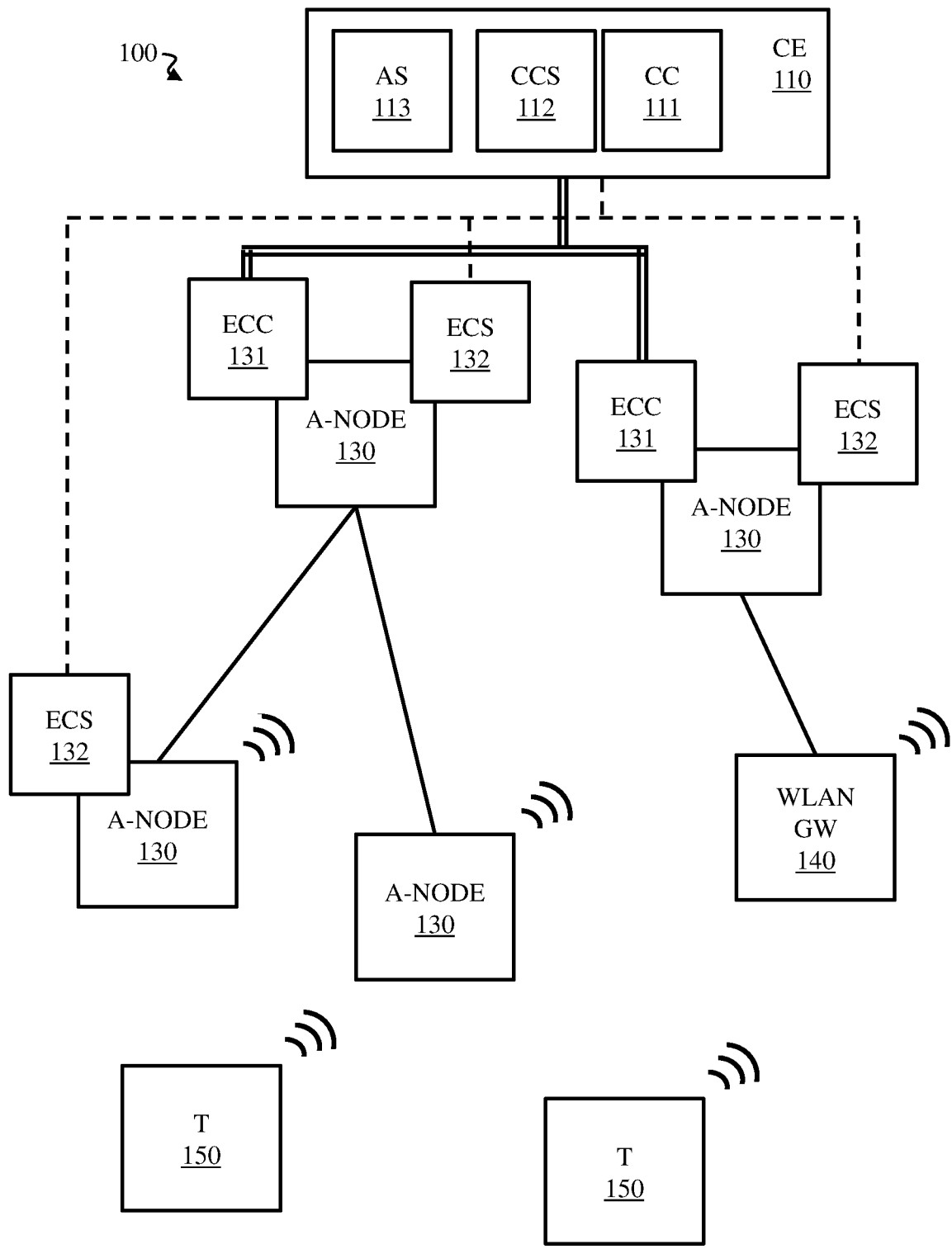
FIG. 1 schematically represents an audio and/or video content delivery system in which the present invention may be implemented.

FIG. 1 schematically represents an audio and/or video content delivery system 100 deployed on top of a mobile network infrastructure. The audio and/or video content delivery system 100 comprises a set of plural edge cache servers ECS 132 and at least one edge cache controller ECC 131.

The edge cache servers ECS 132 aim at transmitting segments of audio and/or video contents to mobile terminals T 150, which are connected by radio to the mobile network infrastructure and which thus may undergo handovers in the mobile network infrastructure over time (and more especially during the same session of delivering an audio and/or video content thereto). For instance, the mobile network infrastructure complies with LTE (Long-Term Evolution) 4G or 5G. The mobile terminals T 150 may thus access the mobile network infrastructure via base stations, eNodeBs, but may also access the mobile network infrastructure via wireless local area networks (WLAN) connected thereto, such as hotspots, for instance provided by WLAN gateways 140.

The mobile network infrastructure comprises aggregation nodes (each one being labelled A-NODE 130 in FIG. 1). Such aggregation nodes are base stations, central offices, eNodeBs, Packet data network GateWays (P-GWs) or Serving GateWays (S-GWs), Terminating User Plane Functions (TUPFs), depending on mobile network infrastructure technology in use. At least some of the aggregation nodes 130 of the mobile network infrastructure implements a breakout function, for instance using MEC-based platforms.

The edge cache servers ECS 132 may be physical appliances, or virtual instances deployed in relatively small cloud infrastructure (also referred to as cloudlet), preferably attached to the aggregation nodes of the mobile network infrastructure.

Each edge cache server ECS 132 is connected to the breakout function of an aggregation node 130 of the mobile network infrastructure. Any aggregation node 130 to which is connected an edge cache server ECS 132 implements a configurable breakout function that allows routing packets, typically IP (Internet Protocol) packets, possibly through the breaking function according to configurable routing rules. Such routing rules may define that packets with such or such destination address and/or such or such source address have to be routed to the edge cache server ECS 132. The breakout function further allows the edge cache server ECS 132 connected thereto to transmit packets via the mobile network infrastructure.

Each edge cache controller ECC 131 is also connected to a breakout function of an aggregation node 130 of the mobile network infrastructure, which may be a breakout function to which is also connected an edge cache server ECS 132. Any aggregation node 130 to which is connected an edge cache server ECS 132 implements a configurable breakout function that allows routing packets, typically IP (Internet Protocol) packets, possibly through the breakout function according to configurable routing rules. Such routing rules may define that packets with such or such destination address and/or such or such source address have to be routed to the edge cache controller ECC 131 via the breakout function. The breakout function further allows the edge cache controller ECS 131 connected thereto to transmit packets via the mobile network infrastructure.

Any and all edge cache servers ECS 132 are associated with an anycast addressing (typically, an anycast IP address and potentially a domain name associated therewith, which enables retrieving the anycast IP address through DNS (Domain Name System) procedures) and the breakout function of each aggregation node 130 to which is connected one of the edge cache servers ECS 132 is configured to route packets having the corresponding anycast address as destination address to the edge cache server ECS 132 connected to the breakout function of said aggregation node 130. It implies that any aggregation node 130 is, at most, connected to one edge cache server ECS 132. It is referred herein to anycast addressing when referring to the at least one anycast IP address or to the potentially at least one respective domain name associated therewith.

It can be noted that the audio and/or video content delivery system 100 may be deployed over several regions, e.g., of a country or of the world, and that the edge cache servers ECS 132 of each region may be associated with their own anycast addressing. It thus avoids that a session initiated in one region be continued when migrating to another region. The deployments in the regions thus act as separate audio and/or video content delivery systems.

Anycast addressing is an one-to-one-of-many transmission, wherein packets are routed to one receiver among plural potential receivers that are all identified by the same address. Thus, when an aggregation node 130 receives a packet having the corresponding anycast address of the edge cache servers ECS 132 as destination address and when furthermore one edge cache server ECS 132 is associated with said aggregation node 130, its breakout function routes said packets to the edge cache server ECS 132 in question, unless its breakout function has been configured to propagate the packets in question upstream in the mobile network infrastructure. As detailed hereafter, such a situation where the breakout function has been configured to propagate upstream in the mobile network infrastructure some packets having the corresponding anycast address of the edge cache servers ECS 132 as destination address occurs when the edge cache server ECS 132 connected to the breakout function of the aggregation node 130 in question has not been selected for processing at least one session to which said packets relate and when another edge cache server ECS 132 located upstream in the mobile network infrastructure is supposed to process said at least one session.

Logically the edge cache servers ECS 132 are interconnected using a tree topology or a star topology, wherein a central content server CCS 112, also referred to as origin server, in a central equipment CE 110 is root of the topology. The edge cache servers ECS 132 are fed with audio and/or video contents by the central content server CCS 112. The central content server CCS 112 may transmit segments of the audio and/or video contents in question to the edge cache servers ECS 132 using broadcast, multicast or unicast transmissions. Moreover, when one or another of the edge cache servers ECS 132 cannot process packets related to an audio and/or video content delivery session (e.g. due to overload or unavailability of the audio and/or video content in question in cache), processing of the packets in question is ensured by another edge cache server ECS 132 upstream (toward the central content server CCS 112) in the topology or by the central content server CCS 112 itself. As detailed hereafter, appropriate configuration of the breakout function of the aggregation nodes shall be done to benefit from this advantage of the topology of the audio and/or video content delivery system 100.

When the audio and/or video content delivery system 100 comprises plural edge cache controllers ECC 131, another anycast addressing (typically, an anycast IP address and potentially a domain name associated therewith, which enables retrieving the anycast IP address through DNS procedures) is associated with the edge cache controllers ECC 131. Thus, when an aggregation node 130 receives a packet having the anycast address of the edge cache controllers ECC 131 as destination address and when furthermore one edge cache controller ECC 131 is associated with said aggregation node 130, its breakout function routes said packets to the edge cache controller ECC 131 in question, similarly as explained above with the edge cache servers ECS 132. It implies that any aggregation node 130 is, at most, connected to one edge cache controller ECC 131.

As above, when the audio and/or video content delivery system 100 is deployed over several regions, e.g., of a country or of the world, the edge cache controllers ECC 131 of each region may be associated with their own anycast addressing, so as to avoid that a session initiated in one region be continued when migrating to another region.

In a particular embodiment, the central equipment CE 110 further comprises a central controller CC 111. The central controller CC 111 may be used to centralized management of contexts of sessions in the audio and/or video content delivery system 100. This particular embodiment can be implemented when the audio and/video content delivery system 100 comprises plural edge cache controllers ECC 131. In this case, the edge cache controllers ECC 131 are logically interconnected using a tree topology or a star topology, wherein a central controller CC 111 is root of the topology.

In a particular embodiment, the central equipment CE 110 further comprises an analytics server AS 113, in charge of collecting analytical data regarding sessions that has been established in the audio and/or video content delivery system 100. Said analytical data gathered from contexts of sessions established in the audio and/or video delivery system 100 are crucial for appropriate infrastructure deployment dimensioning, since these analytical data provide information about edge cache servers ECS 132 in use, handover data (switches between edge cache servers ECS 132), quality delivered during the sessions, etc.

As detailed hereafter, when a mobile terminal T 150 moves from one cell to another in the mobile network infrastructure, an on-the-way audio and/or video content delivery session may have to be handled by another edge cache server ECS 132 so as to ensure service continuity with optimized transmission conditions (RTT, bandwidth consumption . . . ). Regarding the delivery of the audio and/or video data, it is assumed that the service continuity is ensured thanks to mobile infrastructure's handover and mobility procedures (e.g., $3^{rd}$ Generation Partnership Project (3GPP) mobility) as long as the mobile terminal is attached to the same edge cache server ECS 132. However, ensuring the service continuity whenever the mobile terminal switches attachment to another edge cache server ECS 132 during the session is a matter of the audio and/or video content delivery system 100. From the standpoint of each mobile terminal T 150, the service continuity is transparently managed thanks to the anycast addressing used for the edge cache servers ECS 132. From the standpoint of the audio and/or video content delivery system 100, the service continuity is managed thanks to an appropriate definition of session identifiers, which include a unicast addressing (e.g., IP address or dedicated domain name) pointing to an edge cache controller ECC 131 that has originally defined/created the session identifier or alternatively to the central controller CC 111 when centralized management of the session contexts is implemented. A mobile terminal T 150 for which an audio and/or video content delivery session is on-the-way embeds the session identifier in its messages along the session lifetime, or retains in memory along the session lifetime a dedicated cookie including the session identifier, which can then be received by any edge cache server ECS 132. Thus, an edge cache server ECS 132 receiving a request from a mobile terminal T 150 with an unknown session identifier uses the unicast addressing embedded in the session identifier for communicating with the corresponding edge cache controller ECC 131 in order to obtain applicable session context so as to ensure service continuity for the session in question.

Figure 2:
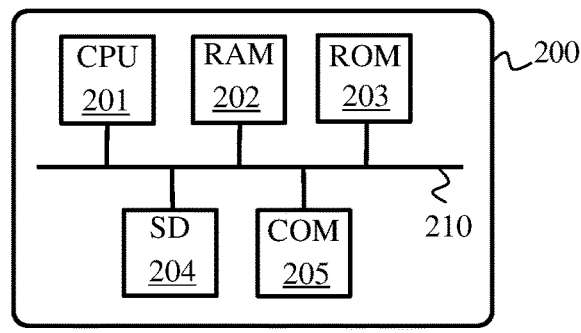
FIG. 2 schematically represents an example of hardware architecture of a device usable in the scope of the audio and/or video content delivery system.

FIG. 2 schematically represents an example of hardware architecture usable in the scope of the audio and/or video content delivery system. The example of hardware architecture may be part of devices embedding the edge cache servers ECS 132 and/or be part of devices embedding the edge cache controllers ECC 131 and/or be part of devices embedding the central equipment CE 110. The example of hardware architecture may be part of devices embedding the central equipment. Let's generally consider that the example of hardware architecture is part of a communication device 200.

According to the shown architecture, the communication device 200 comprises the following components interconnected by a communications bus 210: a processor, microprocessor, microcontroller or CPU (Central Processing Unit) 201; a RAM (Random-Access Memory) 202; a ROM (Read-Only Memory) 203, such as an EEPROM (Electrically Erasable Programmable ROM), for example a Flash memory; an HDD (Hard-Disk Drive) 204, or any other device adapted to read information stored on a non-transitory storage medium, such an SD (Secure Digital) card reader; at least one communication interface 205.

CPU 201 is capable of executing instructions loaded into RAM 202 from ROM 203 or from an external memory, such as HDD 204 or an SD card. After the communication device 200 has been powered on, CPU 201 is capable of reading instructions from RAM 202 and executing these instructions. The instructions form one computer program that causes CPU 201 to perform the steps performed by the communication device in question as described herein.

Thus, the steps, behaviors and algorithms described herein may be implemented in software form by execution of a set of instructions or program by a programmable computing machine, such as a PC, a DSP (Digital Signal Processor) or a microcontroller; or else implemented in hardware form by a machine or a dedicated component, such as an FPGA (Field-Programmable Gate Array) or an ASIC (Application-Specific Integrated Circuit). Generally speaking, the communication device 200 comprises electronics circuitry adapted and configured for implementing the steps, behaviors and algorithms described herein with respect to the communication device 200 in question.

Figure 3:
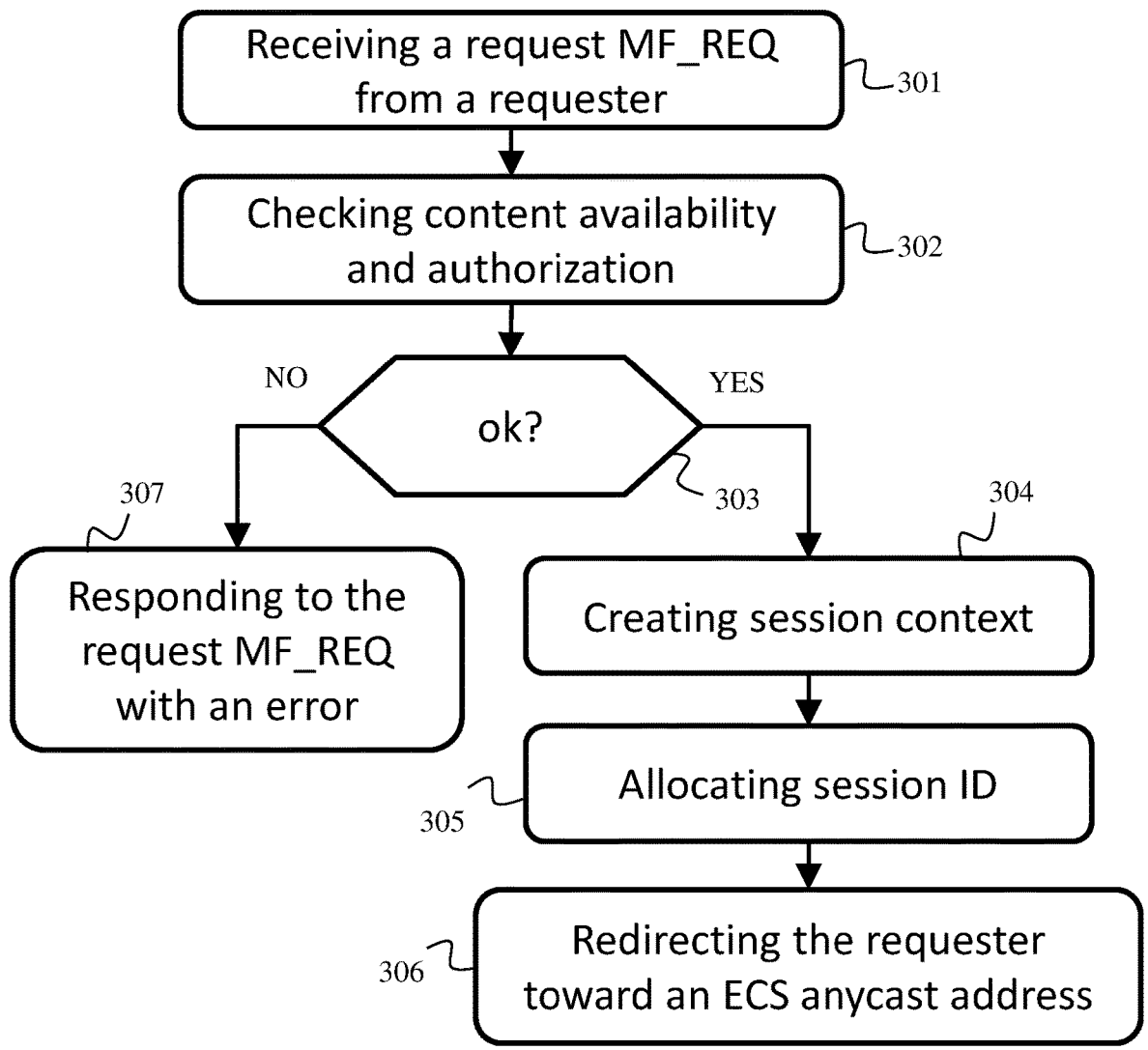
FIG. 3 schematically represents an algorithm for responding to a request for obtaining a manifest file.

FIG. 3 schematically represents an algorithm for responding to a request MF_REQ for obtaining a manifest file. The request MF_REQ is transmitted by a mobile terminal T 150. The request MF_REQ identifies an audio and/or video content supposed to be further requested by the mobile terminal T 150 in question for delivery. The request MF_REQ is addressed to an edge cache controller ECC 131, using thus the anycast addressing of the edge cache controllers ECC 131 when the audio and/or video delivery system 100 comprises plural edge cache controllers ECC 131. When the audio and/or video content delivery system 100 contains only one edge cache controller ECC 131, unicast addressing may be used.

In a step 301, the edge cache controller ECC 131 in question receives a request MF_REQ from a requester, which is a mobile terminal T 150. Note that if the edge cache controller ECC 131 in question has received the request, previously routed by the associated breakout function, it means that the area covered by the edge cache controller ECC 131 in question has the edge cache server resources to process new requests. Otherwise, the edge cache controller ECC 131 in question would have configured its associated breakout function for not routing further requests thereto, which would then be routed upstream to another edge cache controller ECC 131 or to the central controller CC 111. For instance, the request MF_REQ is an HTTP Get request. The requested manifest file describes various representations (quality) made available for the audio and/or video content, so as to enable Adaptive Bit Rate (ABR) implementation. It should be noted that, depending on the Adaptive Bit Rate technology in use, the manifest file may be referred to as playlist file.

In a step 302, the edge cache controller ECC 131 in question performs verification operations and checks whether or not the requested audio and/or video content is available and can be delivered through the edge cache servers infrastructure, and whether the mobile terminal T 150 in question is authorized or not to get the audio and/or video content.

In a step 303, depending on the result of the verification operations, either the session is refused in case of negative check and, in a step 307, the edge cache controller ECC 131 in question responds to the request MF_REQ with an error, which ends the algorithm of FIG. 3; or in case of positive check, the session is accepted and the edge cache controller ECC 131 in question proceeds to a step 304.

In the step 304, the edge cache controller ECC 131 in question creates a context for the session. The context aims at gathering, at least, the list of edge cache servers ECS 132 implied in the session, and associated with for each of them, some QoE related information (such as statistics) and other parameters useful for other potential servers (as addressed hereinafter). Information of the context is updated along the session lifetime.

In a step 305, the edge cache controller ECC 131 in question further allocates (creates) a session identifier for the session in question. The session identifier contains a unique identifier part, which is allocated by the edge cache controller ECC 131 in question. The session identifier further contains a unicast addressing part (e.g., IP address or dedicated domain name) pointing to the edge cache controller ECC 131 in question. The session identifier may further contain a zone identifier, which is an identifier that identifies a geographical area that corresponds to a cell or group of cells, for example as defined by the MEC ETSI group. The session identifier may further contain a Message Authentication Code (MAC), such as keyed-Hash Message Authentication Code (HMAC) to enable verifying both data integrity and authenticity of the session identifier data. The edge cache controller ECC 131 in question then updates the context by including therein the allocated session identifier.

Centralized management of session contexts in use in the audio and/or video content delivery system 100 may be implemented. In this case, the edge cache controller ECC 131 in question uses in the session identifier a unicast addressing (e.g., IP address or dedicated domain name) pointing to the central controller CC 111 instead of the unicast addressing of the edge cache controller ECC 131 in question. Moreover the edge cache controller ECC 131 in question then feeds the central controller CC 111 with the context information. In other words, the context is transmitted in association with the session identifier identifying the session to which the context applies.

In a step 306, the edge cache controller ECC 131 in question redirects the requester toward the anycast addressing of the edge cache servers ECS 132, further providing at least the session identifier allocated in the step 304. The requester is thus supposed to consequently reiterates its request MF_REQ using the anycast address of the edge cache server ECS 132, further including as parameter the session identifier. For example, the edge cache controller ECC 131 includes the session identifier in a query string of a Uniform Resource Locator (URL) using the anycast addressing of the edge cache servers ECS 132, illustratively as follows:

https://cache_server/<content>.manifest?session_id

In a variant to including as parameter the session identifier, the edge cache controller ECC 131 requests in its redirection that the requester, namely the mobile terminal T 150 that transmitted the request MF_REQ, to store a cookie that includes the session identifier and that enables any edge cache server ECS 132 to get the cookie from the requester so as to consequently get the applicable session identifier.

Thus, when the mobile terminal T 150 in question is redirected by the edge cache controller ECC 131, the mobile terminal T 150 in question reiterates its request MF_REQ, but using the addressing provided for redirection, namely the anycast addressing of the edge cache servers ECS 132. Either the reiterated request includes the session identifier (e.g. as query string) or the mobile terminal T 150 has stored in memory a cookie including the session identifier, which enables any solicited edge cache server ECS 132 (depending on the configuration of the breakout functions of the aggregation nodes to which are connected the edge cache servers ECS 132) to get the identifier of the session for which it is solicited.

Figure 4:
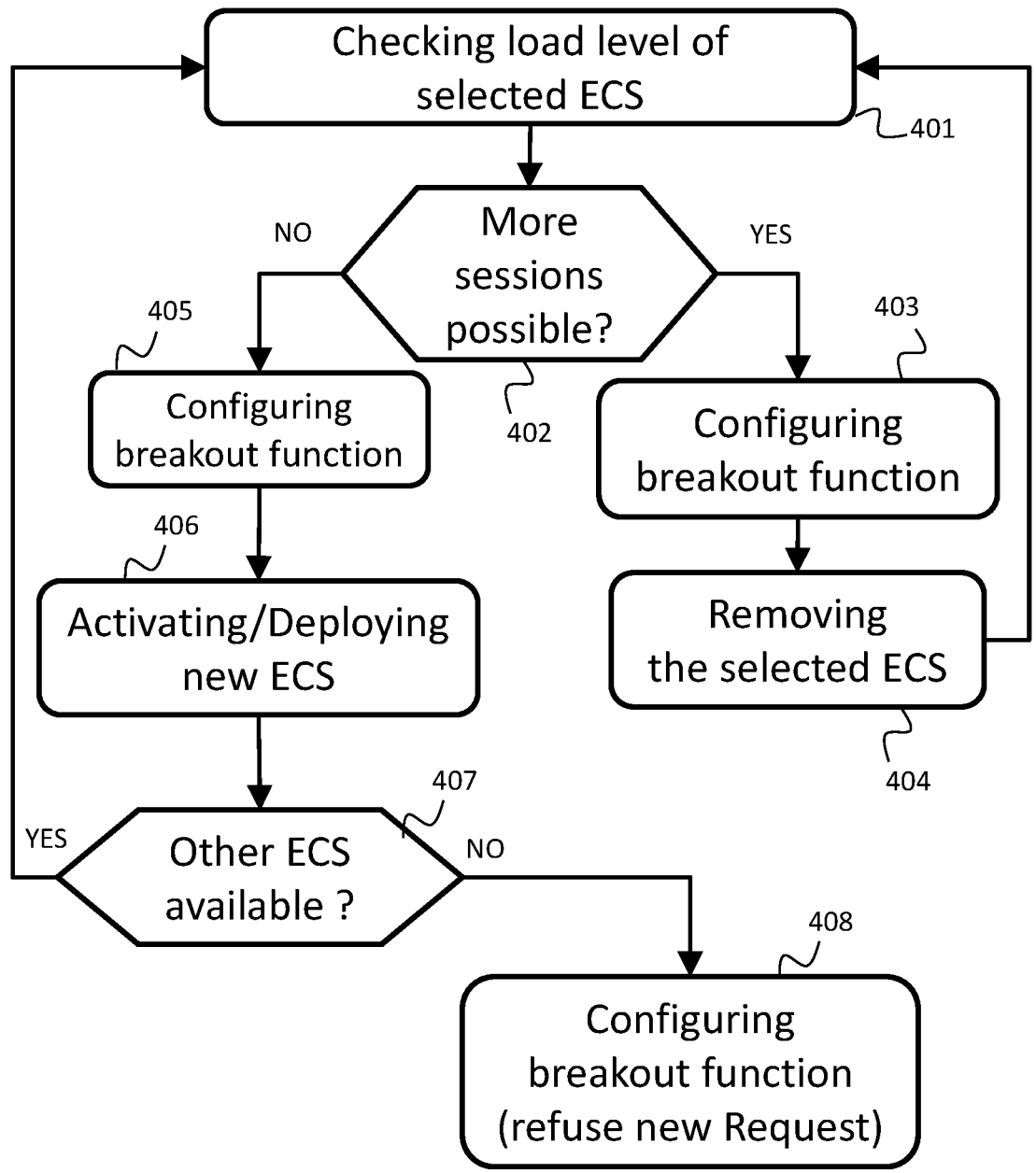
FIG. 4 schematically represents an algorithm for managing the resources of edge cache servers of the audio and/or video content delivery system and for correspondingly managing configuration of breakout functions.

FIG. 4 represents an algorithm for managing the resources of a set of edge cache servers ECS 132 by an edge cache controller ECC 131 and for correspondingly managing breakout functions configuration. This process runs at any time, regularly and is implemented by the edge cache controller(s) ECC 131 or any entity associated and connected therewith.

In a step 401, the edge cache controller ECC 131 in question checks availability (typically, load level in percentage used resources, such as CPU or processing resources, and/or storage or memory resources and/or network bandwidth resources) of the edge cache server(s) ECC 132 under its control (each edge cache server is associated with one edge cache controller ECC 131, and each edge cache controller ECC 131 oversees at least one edge cache server ECS 132).

The edge cache controller ECC 131 selects one edge cache server ECS 132 and checks availability of the selected edge cache server ECS 132. The edge cache controller ECC 131 in question uses a unicast addressing for contacting the selected edge cache server ECS 132 so as to determine whether or not the selected edge cache server ECS 132 is able to deliver an audio and/or video content to a mobile terminal T 150. For instance, the selected edge cache server ECS 132 may not be able to deliver an audio and/or video content due to overload or due to insufficient resources to cache the audio and/or video content.

In a step 402, the edge cache controller ECC 131 in question determines if the selected edge cache server ECS 132 has sufficient resources to accept more sessions. When the selected edge cache server ECS 132 has sufficient resources to accept more sessions, a step 403 is performed; otherwise, a step 405 is performed.

If the selected edge cache server ECS 132 is not able to accept more sessions, the edge cache controller ECC 131 in question configures, in the step 405, the breakout function of the aggregation node 130 to which is connected the selected edge cache server ECS 132 for not routing new sessions thereto. In other words, ongoing sessions are accepted to continue to be processed by the selected edge cache server ECS 132, but not new ones. This is a question of appropriate filtering configuration of the breakout function, which depends on the programming interface of the breakout function. For instance, the breakout function may export a programming interface function that enables instructing that no new session has to be routed toward the edge cache server ECS 132 in question. The packets of a particular session are detected thanks to, e.g., the quadruplet formed by the source address:port number, on one hand, and the destination address:port number, on the other hand, contained in routing headers of said packets. Therefore, packets transmitted later on by a mobile terminal T 150 to the anycast addressing associated with the edge cache servers ECS 132 for a new session, when reaching the corresponding breakout function, are not output by the breakout function to the selected edge cache server ECS 132 and the packets follow upstream path in the mobile network infrastructure.

In the step 406, the edge cache controller ECC 131 in question may decide to possibly activate, or deploy/instantiate (in case of cloudlet), a new edge cache server ECS 132 in its area under supervision, in order to mitigate lack of resources. In other words, the edge cache controller ECC 131 increases the number of edge cache servers ECS 132 in the set of edge cache servers ECS 132 under its control.

In a step 407, the edge cache controller ECC 131 in question checks whether or not none of the edge cache servers ECS 132 under its supervision have any more resources to accept new sessions. When no more edge cache servers ECS 132 are available and consequently no more resources can be allocated to processing new sessions, the edge cache controller ECC 131 in question, in a step 408, configures its associated breakout function for not receiving anymore requests related to new sessions. New sessions are then handled by another edge cache controller ECC 131 upstream or by the central controller CC 111, if any (otherwise, no new sessions can be handled). In the step 407, when at least one other edge cache server ECS 132 is available, the step 401 is repeated.

If the selected edge cache server ECS 132 has sufficient resources to accept more sessions (see step 402), in the step 403, the edge cache controller ECC 131 in question may possibly (in the case where the selected edge cache server ECS 132 was previously overloaded and its corresponding breaking function configured for not routing packets of new sessions to the selected edge cache server ECS 132) configure back the breakout function of the aggregation node 130 to which is connected the selected edge cache server ECS 132 in order to route the packets of future new sessions to the selected edge cache server ECS 132.

And in a step 404, the edge cache controller ECC 131 may possibly decide to inactivate or shutdown/remove the selected edge cache server ECS 132 due to, e.g., too many available resources (which gives rise to unnecessary energy consumption). In that case, the edge cache controller ECC 131 in question configures the breakout function of the aggregation node, to which is connected the selected edge cache server ECS 132, for not routing packets of future new sessions to said selected cache server ECS 132. Furthermore, when all existing sessions managed by the selected cache server ECS 132 are ended, the selected edge cache server ECS 132 is inactivated or shutdown/uninstalled (in case of cloudlet). Then the step 401 is repeated.

Figure 5:
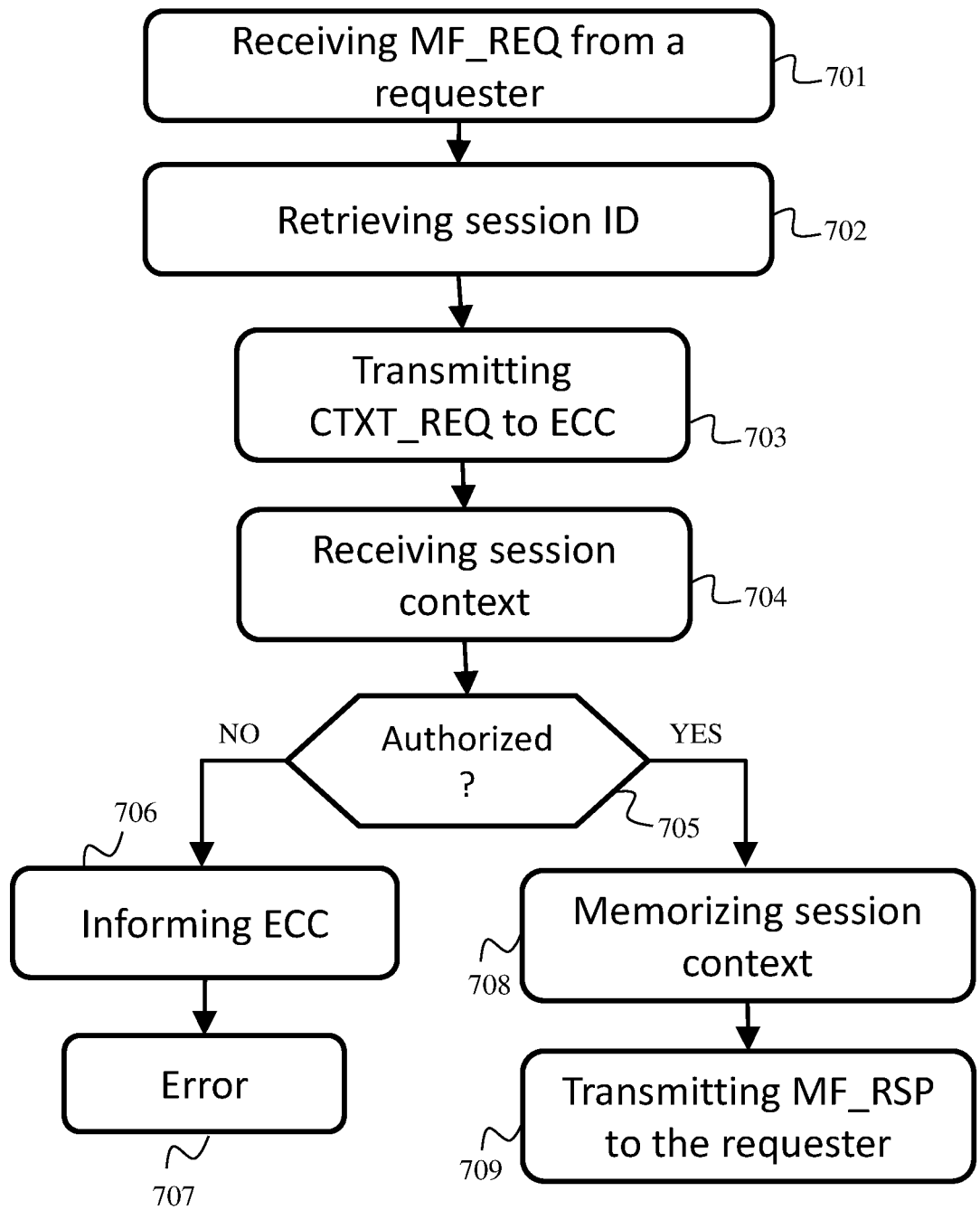
FIG. 5 schematically represents an algorithm for responding to a request for obtaining a manifest file after redirection.

FIG. 5 schematically represents an algorithm for responding to a request MF_REQ for obtaining a manifest file once a mobile terminal T 150 has been redirected toward an edge cache server ECS 132. The request MF_REQ thus uses the anycast addressing of the edge cache servers ECS 132.

In a step 701, the edge cache server ECS 132 in question receives a request MF_REQ from a requester, which is a mobile terminal T 150. For instance, the request MF_REQ is an HTTP Get request. The request MF_REQ received in the step 701 is transmitted consequently as a redirection from an edge cache controller ECC 131, as already described with respect to FIG. 3.

In a step 702, the edge cache server ECS 132 in question retrieves the session identifier to which the request MF_REQ relates. The session identifier is contained in the request MF_REQ, for instance as query string of a URL, or in a cookie memorized by the mobile terminal T 150 in question during former exchanges with the edge cache controller ECC 131 having redirected said mobile terminal T 150 for obtaining the manifest file to which the request MF_REQ relates.

In a step 703, the edge cache server ECS 132 in question transmits a request CTXT_REQ to the the edge cache controller ECC 131 (or the central controller CC 111), that is identified by its unicast addressing in the session identifier. The request CTXT_REQ aims at obtaining in response the context information applicable to the session to which the request MF_REQ relates. To do so, the edge cache server ECS 132 in question uses the unicast addressing present in the session identifier.

Figure 7:
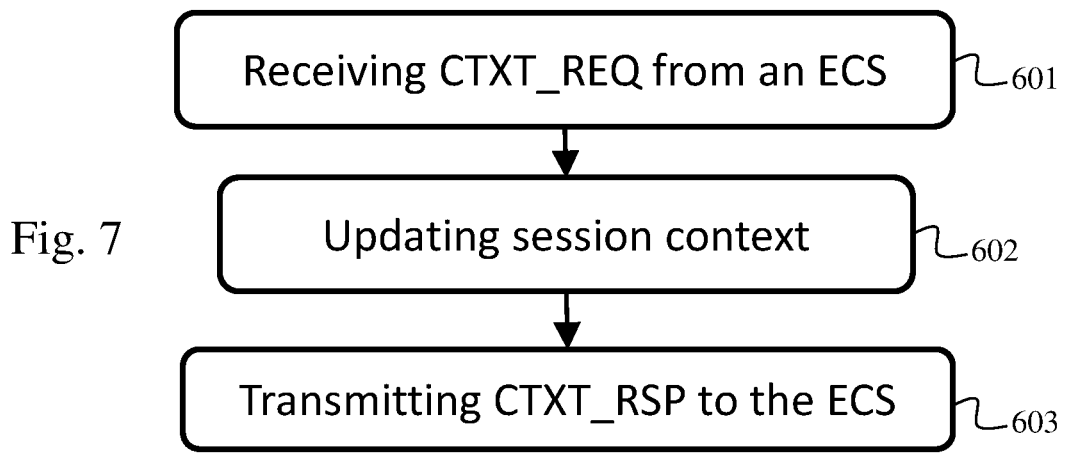
FIG. 7 schematically represents an algorithm for processing a request for obtaining a session context.

In a step 704, the edge cache server ECS 132 in question receives, in response, the requested context (see FIG. 7).

In a step 705, the edge cache server ECS 132 in question checks whether or not the edge cache server ECS 132 in question is authorized for delivering the audio and/or video content to which the requested manifest file relates. In particular, the edge cache server ECS 132 checks whether or not the audio and/or video content can be cached from the origin server by the edge cache server ECS 132 in question (e.g., availability of the audio and/or video content in the region in which the edge cache server ECS 132 in question is located). When the edge cache server ECS 132 in question is authorized for delivering the audio and/or video content and for accepting the new session, a step 708 is performed; otherwise, a step 706 is performed.

In the step 706, the edge cache server ECS 132 in question informs the edge cache controller ECC 131, which is identified by its unicast addressing in the session identifier, that said edge cache server ECS 132 is not authorized for delivering the audio and/or video content to which the session in question relates. To do so, the edge cache server ECS 132 in question transmits to the edge cache controller ECC 131 in question a message NOT_AUTHORIZED.

In a step 707, the edge cache server ECS 132 in question responds to the request MF_REQ with an error code. The mobile terminal T 150 in question is thus not authorized to receive the requested audio and/or video content, for instance due to regional delivery restrictions with respect to the audio and/or video content in question. The algorithm of FIG. 5 then ends.

In a step 708, the edge cache server ECS 132 in question memorizes the received context, which is then used to process the session for delivering to the mobile terminal T 150 the audio and/or video content to which the request MF_REQ relates. The context contains at least information stipulating whether the mobile terminal T 150 in question is authorized to get the audio and/or video content. The context further contains information indicating that the session is started with the edge cache server ECS 132 in question. This latter information may be inserted in the context by the edge cache controller ECC 131 or by the edge cache server ECS 132 in question.

In a step 709, the edge cache server ECS 132 in question retrieves in cache, or from the central content server CCS 112, the manifest file to which the request MF_REQ relates, and transmits the retrieved manifest file in a message MF_RSP in response to the request MF_REQ received in the step 701.

Figure 6:
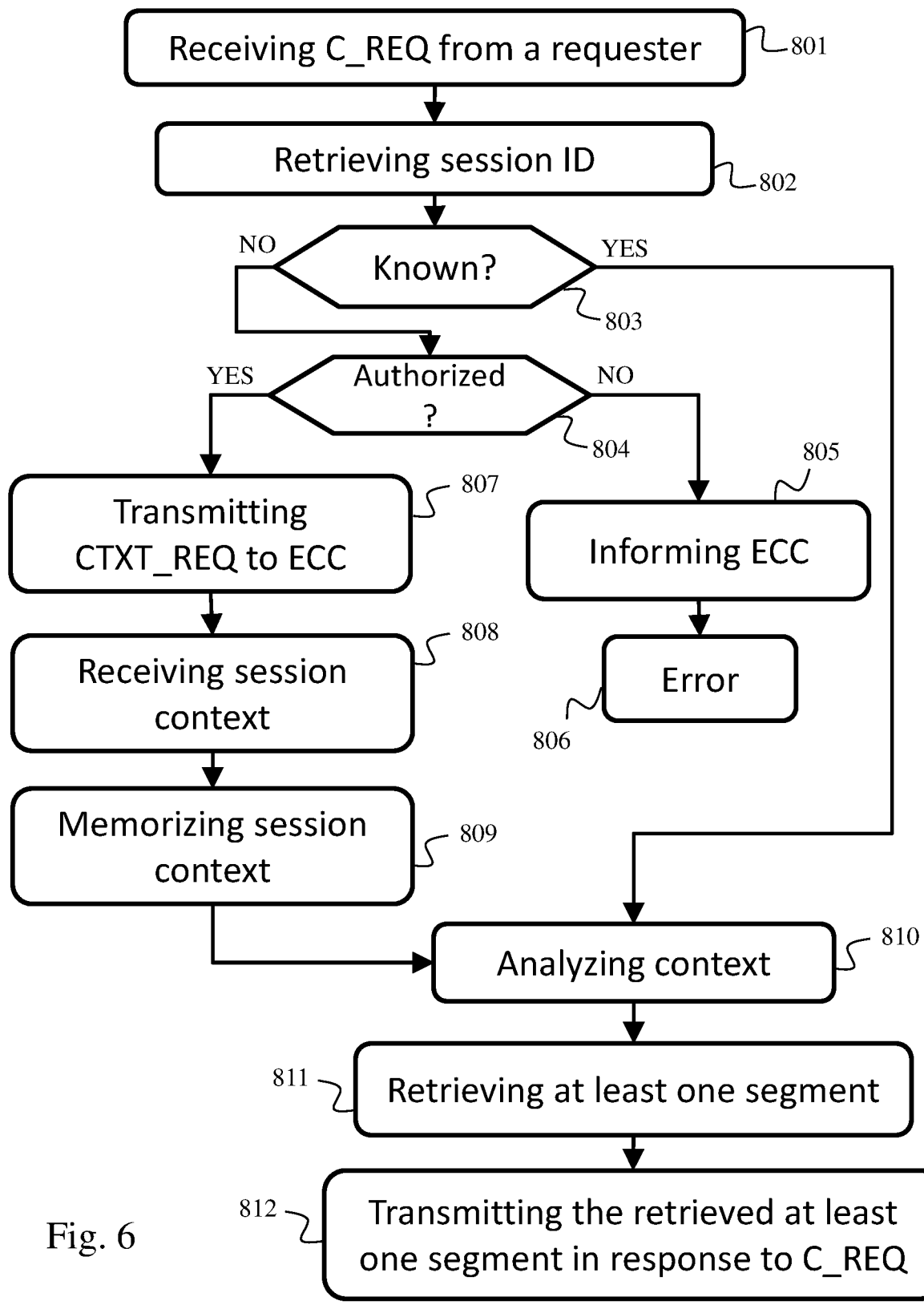
FIG. 6 schematically represents an algorithm for responding to a request for obtaining at least one segment of audio and/or video content.

FIG. 6 schematically represents an algorithm for responding to a request C_REQ for obtaining at least one segment of audio and/or video content. The request C_REQ thus uses the anycast addressing of the edge cache servers ECS 132, since this anycast addressing has been used previously for obtaining the manifest file of the audio and/or video content in question.

In a step 801, the edge cache server ECS 132 in question receives a request C_REQ from a requester, which is a mobile terminal T 150. For instance, the request C_REQ is an HTTP Get request.

In a step 802, the edge cache server ECS 132 in question retrieves the session identifier to which the request MF_REQ relates. The session identifier is contained in the request C_REQ, for instance as query string of a URL using the anycast addressing of the edge cache servers ECS 132, or in a cookie memorized by the mobile terminal T 150 in question, as already explained.

In a step 803, the edge cache server ECS 132 in question checks whether or not the edge cache server ECS 132 in question knows the retrieved session identifier. In other words, the edge cache server ECS 132 in question checks whether or not the session identifier, and the corresponding session context, is stored in memory of the edge cache server ECS 132. If the retrieved session identifier is known, a step 810 is performed; otherwise, a step 804 is performed.

When the session identifier is unknown to the edge cache server ECS 132 in question, it means that the mobile terminal T 150 has incurred a handover in the mobile network infrastructure and thus the anycast addressing used in the request C_REQ points to a different edge cache server ECS 132 than previously in the session. Then, in the step 804, the edge cache server ECS 132 in question checks whether or not the edge cache server ECS 132 in question is authorized for delivering the audio and/or video content to which the request C_REQ relates. In particular, the edge cache server ECS 132 checks whether or not the audio and/or video content can be cached from the origin server by the edge cache server ECS 132 in question (e.g., availability of the audio and/or video content in the region in which the edge cache server ECS 132 in question is located). When the edge cache server ECS 132 in question is authorized for delivering the audio and/or video content and accepting the corresponding session, a step 807 is performed; otherwise, a step 805 is performed.

In the step 805, the edge cache server ECS 132 in question informs the edge cache controller ECC 131 (or the central controller CC 111), which is identified by its unicast addressing in the session identifier, that said edge cache server ECS 132 is not authorized for delivering the audio and/or video content to which the session in question relates. To do so, the edge cache server ECS 132 in question transmits to the edge cache controller ECC 131 in question a message NOT_AUTHORIZED. The mobile terminal T 150 in question is thus not authorized to receive the requested audio and/or video content, for instance due to regional delivery restrictions with respect to the audio and/or video content in question.

In a step 806, the edge cache server ECS 132 in question responds to the request C_REQ with an error code. The algorithm of FIG. 8 then ends.

In the step 807, the edge cache server ECS 132 in question transmits a request CTXT_REQ to the edge cache controller ECC 131 (or the central controller CC 111), that is identified by its unicast addressing in the session identifier. To do so, the edge cache server ECS 132 in question uses the unicast addressing present in the session identifier.

In a step 808, the edge cache server ECS 132 in question receives, in response, the requested context (see FIG. 7).

In a step 809, the edge cache server ECS 132 in question memorizes the received context, which is then used to process the session for delivering to the mobile terminal T 150 the audio and/or video content to which the request C_REQ relates. Then the step 810 is performed.

In the step 810, the edge cache server ECS 132 in question analyses the context associated with the session to which the request C_REQ relates. In a particular embodiment, the edge cache server ECS 132 in question retrieves, from statistics stored in the context, information related to quality in Adaptive Bit Rate which is preferably selected by the mobile terminal T 150 in the session, so as to help the edge cache server ECS 132 in question to know how to serve the mobile terminal T 150 in question. In particular, the context enables the edge cache server ECS 132 in question to know whether the mobile terminal T 150 in question is effectively authorized to be served, and whether or not the mobile terminal T 150 in question is effectively authorized to be served for audio and/or video content in question. In addition, context information can be used to anticipate the behavior of the mobile terminal T 150, such as last quality served, how long the mobile terminal T 150 in question stays attached to one server, etc.

In a step 811, the edge cache server ECS 132 in question retrieves, e.g. in cache, at least one segment of the audio and/or video content to which the session in question relates, as requested by the request C_REQ.

In a step 812, the edge cache server ECS 132 in question transmits the retrieved at least one segment in a message C_RSP in response to the request C_REQ received in the step 801.

FIG. 7 schematically represents an algorithm for processing a request CTXT_REQ for obtaining a context associated with a session. The algorithm of FIG. 7 is implemented by an edge cache controller ECC 131 or by the central controller CC 111. Let's illustratively consider that the algorithm of FIG. 7 is implemented by an edge cache controller ECC 131. The request CTXT_REQ is transmitted by an edge cache server ECS 132 when being solicited for an unknown session, namely a session that was not under processing by the edge cache server ECS 132 in question. This situation occurs because said edge cache server ECS 132 just received a request MF_REQ. This aspect has been addressed above with respect to FIG. 5. This situation also occurs because said edge cache server ECS 132 just received a request C_REQ for obtaining at least one segment of audio and/or video content, relatively to a session initiated with a previous edge cache server ECS132 and not under processing by said edge cache server ECS 132. This aspect has been addressed above with respect to FIG. 6.

In a step 601, the edge cache controller ECC 131 in question receives a request CTXT_REQ from an edge cache server ECS 132. The request CTXT_REQ includes a session identifier identifying the session for which the context is requested. The request CTXT_REQ has been addressed to the edge cache controller ECC 131 in question using unicast addressing related to the edge cache controller ECC 131 in question, as included in the session identifier.

In a step 602, the edge cache controller ECC 131 updates the context, if need be, preferably to indicate that the session is now managed/supported by the edge cache server ECS 132 in question.

In a step 603, the edge cache controller ECC 131 in question transmits the requested context. Unicast addressing is also used to respond to the request CTXT_REQ to ensure that the right edge cache server ECS 132 receives the requested context.

Figure 8:
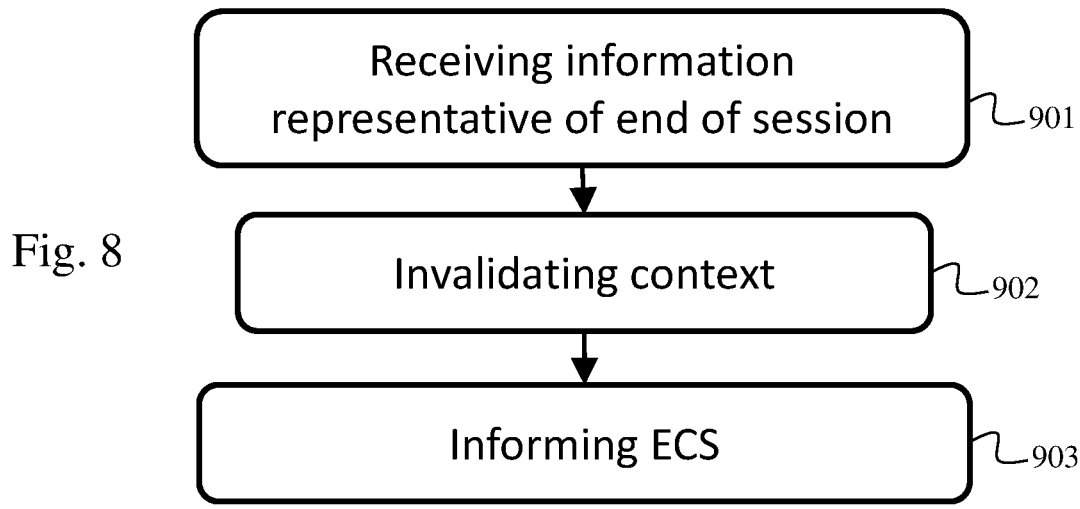
FIG. 8 schematically represents an algorithm for terminating an audio and/video content delivery session.

FIG. 8 schematically represents an algorithm for terminating an audio and/video content delivery session. The algorithm of FIG. 8 is implemented by the edge cache controller ECC 131 with which the session has started (as referenced in the session identifier), or by the central controller CC 111 when centralized management of contexts of sessions is implemented. Let's illustratively consider that the algorithm of FIG. 8 is implemented by the edge cache controller ECC 131 with which the session has started.

In a step 901, the edge cache controller ECC 131 in question receives information, from an edge cache server ECS 132 (or from the central content server CCS 112) indicating that the session in question is interrupted. Details are provided hereafter with respect to FIG. 9. When being notified by an edge cache server ECS 132 that the session is interrupted without having received a request CTXT_REQ from another edge cache server ECS 132 within a predefined timeframe, the edge cache controller ECC 131 in question knows that the session in question has been terminated.

In a step 902, the edge cache controller ECC 131 in question invalidates the context associated with the session, since the session has ended. The edge cache controller ECC 131 may consequently transmit to the analytical server AS 113 analytical data related to the session that has ended, as contained in the context in question. In a variant, the analytical data are transmitted to the analytical server by the each edge cache server ECS 132 that has been implied in the session that has ended, as indicated hereafter with respect to FIG. 9.

Then, in an optional step 903, the edge cache controller ECC 131 in question informs each edge cache server ECS 132 that has been involved in the session that the session in question has ended. The edge cache controller ECC 131 retrieves information about each edge cache server ECS 132 that has been implied in the session in question by parsing the context of said session before invalidating said context.

Figure 9:
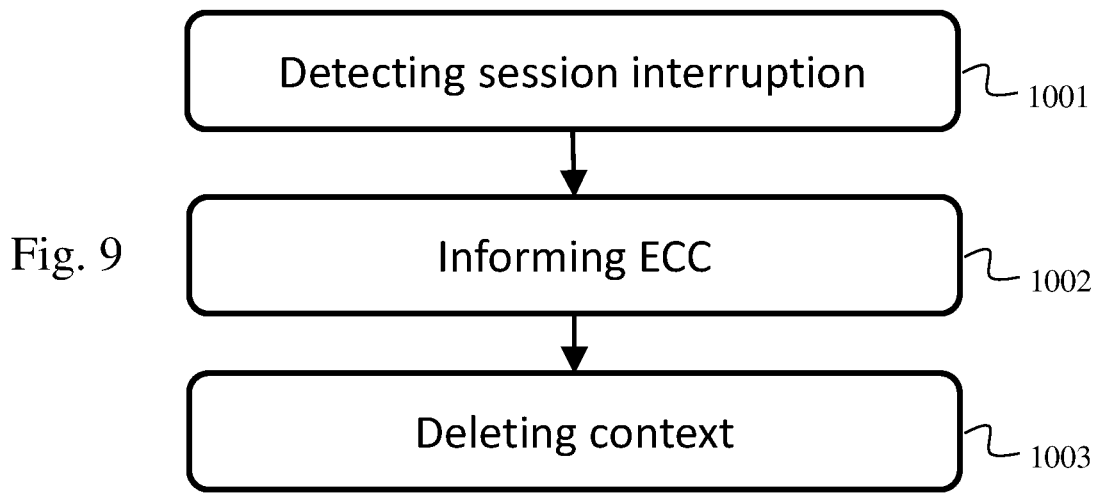
FIG. 9 schematically represents an algorithm for processing interruption of an audio and/video content delivery session.

FIG. 9 schematically represents an algorithm for processing interruption of an audio and/video content delivery session. The algorithm of FIG. 9 is implemented by an edge cache server ECS 132 with which the session was ongoing.

In a step 1001, the edge cache server ECS 132 in question detects interruption of the session. Either the interruption is due to end of playing of the audio and/or video content by the mobile terminal T 150 to which the session applies, or the interruption is due to a handover toward another edge cache server ECS 132.

In a particular embodiment, the interruption is detected by receiving a message from the mobile terminal T 150 in question which explicitly notifies session tear down.

In another particular embodiment, the interruption is detected by expiry of a predefined time duration since the last exchange with the mobile terminal T 150 in question.

In yet another particular embodiment, the interruption is detected by detecting that the last segment of the audio and/or video content has been transmitted to the mobile terminal T 150 in question.

In a step 1002, the edge cache server ECS 132 in question informs, by unicast addressing, the edge cache controller ECC 131 with which the session has started (as referenced in the session identifier), or the central controller CC 111 when centralized management of contexts of sessions is implemented, that the session has been interrupted. As already mentioned, the unicast addressing is contained in the session identifier associated with the context. The edge cache server ECS 132 in question transmits at this occasion analytical data updating the context of the session, so as to enable the edge cache controller ECC 131 to provide updated analytical data to the analytics server AS 113. Preferably, the analytical data include information about the last quality served for the audio and/or video content in question in the session by the edge cache server ECS 132 in question, information about how long the session has last with the edge cache server ECS 132 in question, information about quantity of switches between qualities of the audio and/or video content in question in the session by the edge cache server ECS 132 in question, time spent with each quality of audio and/or video content in question in the session by the edge cache server ECS 132 in question, mean quality served for the audio and/or video content in question in the session by the edge cache server ECS 132 in question, minimum quality served for the audio and/or video content in question in the session by the edge cache server ECS 132 in question, and maximum quality served for the audio and/or video content in question in the session by the edge cache server ECS 132 in question. In a variant, the edge cache server ECS 132 in question further transmits the analytical data to the analytics server AS 113.

In a step 1003, the edge cache server ECS 132 in question deletes the context associated with the session, since the session is no more supported by the edge cache server ECS 132 in question (either due to termination or handover). If the interruption is due to handover, and if the edge cache server ECS 132 in question is again solicited later on for supporting the session due to another handover of the mobile terminal T 150 in question during the session, the edge cache server ECS 132 in question would have to request updated context to the edge cache controller ECC 131 in question (or to the central controller CC 111 when centralized management of contexts of sessions is implemented).

The invention claimed is:

1. A method for delivering an audio and/or video content to a mobile terminal by a content delivery system deployed on top of a mobile network infrastructure, wherein the content delivery system comprises plural edge cache servers and at least one edge cache controller, the edge cache servers are arranged using a star topology or a hierarchical topology using a central content server as root, the edge cache servers and the central content server are connected to respective aggregation nodes of the mobile network infrastructure such that a configurable breakout function of the aggregation nodes enables routing to the edge cache servers or to the central content server packets addressed to an anycast addressing associated with the edge cache servers and the central content server, wherein the method comprises:
   receiving, by one edge cache controller, a first request, from the mobile terminal, for obtaining a manifest file of the audio and/or video content so as to start a session for delivering the audio and/or video content;
   creating, by the edge cache controller in question, a session identifier including a unique identifier part and a unicast addressing part pointing to the edge cache controller in question;
   responding to the first request, by the edge cache controller in question, by redirecting the mobile terminal to the anycast addressing of the edge cache servers and of the central content server and by providing the session identifier to the mobile terminal;
   receiving, by one edge cache server, a second request including the session identifier, from the mobile terminal, for obtaining the manifest file or for obtaining at least one segment of the audio and/or video content;
   obtaining from the second request, by the one edge cache server in question, the session identifier associated with the session started for delivering the audio and/or video content to the mobile terminal in question;
   when the obtained session identifier is unknown to the one edge cache server in question, using the unicast addressing part included in the obtained session identifier to send a third request for obtaining a context applicable to the session;
   when the obtained session identifier is known to the edge cache server in question or obtained by the edge cache server in question, delivering respectively the requested manifest file or the at least one segment to the mobile terminal, in response to the second request, according to the context applicable to the session;
   and when an edge cache server is not able to process new sessions, reconfiguring the breakout function of the aggregation node to which is connected the edge cache server in question so as not to route packets related to the new sessions toward said edge cache server in question so that an upstream edge cache server or the central content server is solicited to process the new sessions.

2. The method according to claim 1, wherein the content delivery system comprises plural edge cache controllers, the edge cache controllers are deployed using a star topology or a hierarchical topology using a central controller as root, the edge cache controllers and the central controller are connected to respective aggregation nodes of the mobile network infrastructure such that the configurable breakout function of the aggregation nodes enables routing to the edge cache controllers or to the central controller packets addressed to an anycast addressing associated with all the edge cache controllers and the central controller, and wherein the first request is transmitted using the anycast addressing associated with the edge cache controllers and the central controller.

3. The method according to claim 1, wherein when one edge cache controller receives the third request for obtaining a context applicable to the session, the edge cache controller in question updates the context applicable to the session to indicate that the session is now supported by the edge cache server from which the third request is received.

4. The method according to claim 2, wherein the edge cache controller in question checks whether or not none of the edge cache servers of a set of edge cache servers under its supervision have any more resources to accept new sessions, and when no more resources can be allocated to accept new sessions, the edge cache controller in question configures the breakout function of the aggregation node to which said edge cache controller is connected for not receiving anymore requests related to new sessions.

5. The method according to claim 4, wherein when creating the session identifier, the edge cache controller in question includes therein a unicast addressing part pointing to the central controller instead of the unicast addressing part pointing to the edge cache controller in question, and wherein the edge cache controller in question transmits the context applicable to the session to the central controller.

6. The method according to claim 1, wherein the edge cache controller in question manages a set of edge cache servers under its supervision by implementing on a regular basis:
  determining if each edge cache server of the set has sufficient resources to accept more sessions;
  for each edge cache server of the set which is not able to accept more sessions, the edge cache controller in question configures the breakout function of the aggregation node to which is connected the edge cache server in question for not routing new sessions thereto.

7. The method according to claim 1, wherein when one edge cache server receives the context applicable to the session, the edge cache server in question retrieves from statistics stored in the context, information related to quality in Adaptive Bit Rate which is selected by the mobile terminal in the session.

8. The method according to claim 1, wherein when being notified by one edge cache server that the session is interrupted without having received the third request from another edge cache server within a predefined timeframe, one edge cache controller invalidates the context associated with the session and transmits to an analytical server analytical data related to the session and contained in the context.

9. The method according to claim 1, wherein the edge cache servers are virtual instances executed in a cloudlet infrastructure.

10. A content delivery system for delivering an audio and/or video content to a mobile terminal, the content delivery system being configured for being deployed on top of a mobile network infrastructure, wherein the content delivery system comprises plural edge cache servers and at least one edge cache controller, the edge cache servers are arranged using a star topology or a hierarchical topology using a central content server as root, the edge cache servers and the central content server being configured to be connected to respective aggregation nodes of the mobile network infrastructure such that a configurable breakout function of the aggregation nodes enables routing to the edge cache servers or to the central content server packets addressed to an anycast addressing associated with the edge cache servers and the central content server, wherein the content delivery system is configured for:
  receiving, by one edge cache controller, a first request, from the mobile terminal, for obtaining a manifest file of the audio and/or video content so as to start a session for delivering the audio and/or video content;
  creating, by the edge cache controller in question, a session identifier including a unique identifier part and a unicast addressing part pointing to the edge cache controller in question;
  responding to the first request, by the edge cache controller in question, by redirecting the mobile terminal to the anycast addressing of the edge cache servers and of the central content server and by providing the session identifier to the mobile terminal;
  receiving, by one edge cache server, a second request including the session identifier, from the mobile terminal, for obtaining the manifest file or for obtaining at least one segment of the audio and/or video content;
  obtaining from the second request, by the one edge cache server in question, the session identifier associated with the session started for delivering the audio and/or video content to the mobile terminal in question;
  when the obtained session identifier is unknown to the one edge cache server in question, using the unicast addressing part included in the obtained session identifier to send a third request for obtaining a context applicable to the session;
  when the obtained session identifier is known to the edge cache server in question or obtained by the edge cache server in question, delivering respectively the requested manifest file or the at least one segment to the mobile terminal, in response to the second request, according to the context applicable to the session;
  and when an edge cache server is not able to process new sessions, reconfiguring the breakout function of the aggregation node to which is connected the edge cache server in question so as not to route packets related to the new sessions toward said edge cache server in question so that an upstream edge cache server or the central content server is solicited to process the new sessions.

* * * * *